Reissued July 10, 1923. Re. 15,648

UNITED STATES PATENT OFFICE.

ELMER ELLSWORTH ELDREDGE, OF ZEELAND, MICHIGAN, ASSIGNOR TO PHENIX CHEESE COMPANY, OF NEW YORK, N. Y., A CORPORATION OF NEW YORK.

PROCESS OF STERILIZING CHEESE.

No Drawing. Original No. 1,374,141, dated April 5, 1921, Serial No. 326,038, filed September 24, 1919. Application for reissue filed January 27, 1923. Serial No. 615,368.

*To all whom it may concern:*

Be it known that I, ELMER E. ELDREDGE, a citizen of the United States, residing at Zeeland, State of Michigan, have invented new and useful Improvements in Processes of Sterilizing Cheese, of which the following is a specification.

This invention relates to a process of sterilizing cheese and the product which is obtained thereby and has for its object the provision of a process whereby the cheese may be completely sterilized in such a manner that the disintegration of the cheese is prevented and a cheese mass produced of a good body and texture and very palatable.

In my previous application Serial No. 303,391, filed June 11, 1919, I have described a process for sterilizing cheese which consists essentially in the following steps:

The cheese is trimmed and ground or sliced into small particles after which it is placed in a mixing kettle and about two per cent of sodium citrate by weight and a small amount of water is added, after which the material is brought to a temperature of 170° F. While it is in the melted condition it is then poured into containers which are hermetically sealed. The containers after being filled and sealed, in the manner described, are then placed in a steam retort and the temperature of the container and its cheese content is raised to about 240° F. where it is maintained for a period of time sufficient to completely sterilize the cheese. In practice it is found advisable to maintain this temperature of approximately 240° F. until the center of the cheese has been maintained at this temperature for about 20 minutes. The duration of the sterilizing treatment is therefore determined by the size of the can or package of cheese, the larger size containers requiring a greater time for complete sterilization.

In this process I have described that by adding the two per cent of sodium citrate by weight to the cheese mass, the constituents of the cheese are prevented from disintegrating as for example, the fats and casein will not separate out and this is true even when the sealed container and its cheese contents is raised to a temperature of approximately 240° F.

In my prior process I have described that sodium citrate or sodium lactate are the only ingredients which may be added to the cheese mass and which to my knowledge will prevent the disintegration of the cheese. I have discovered however, that there can be substituted for the sodium citrate or the sodium lactate, other chemicals which will react with the cheese in the same manner and prevent the disintegration of the cheese.

Accordingly, therefore, the present invention consists in the process as above outlined with the exception that, instead of adding 2% by weight of sodium citrate or sodium lactate, I use in place of these salts approximately 2% by weight of sodium phosphate. This chemical is added to the cheese while in the mixing kettle, as previously described, and I have found that by the use of this chemical instead of sodium citrate, the separation of the cheese mass into its constituents is prevented and, in fact, a cheese obtained which has a good body and is very palatable. Therefore, it is my intention to claim the process above described in combination with the use of the chemical described, as will be clear from the scope of the claims appended hereto.

I claim:

1. In a process of sterilizing cheese, the steps which comprise mixing approximately 98% of the cheese with 2% of sodium phosphate, then heating the mass to a sterilizing temperature.

2. In a process of sterilizing cheese, the steps which comprise mixing approximately 98% of cheese with approximately 2% of sodium phosphate, then heating the mass and while in a melted condition packing it in containers and thereafter sealing the containers and finally raising the temperature of the container and its contents to a sterilizing temperature and maintaining this temperature for a sufficient period of time to sterilize the cheese.

3. In a process of sterilizing cheese, the steps which comprise mixing approximately 98% of cheese with approximately 2% of sodium phosphate, then heating the mass and while in a melted condition packing it in containers and thereafter sealing the containers and finally raising the temperature of the container and its contents to approximately 240° F. and maintaining this temperature for a sufficient time to sterilize the cheese.

4. In a process of sterilizing cheese, the steps which comprise mixing approximately 98% of cheese and 2% by weight of sodium phosphate, then heating the mass and while in a melted condition packing it in containers and thereafter sealing the containers and finally raising the temperature of the container and its contents to a sterilizing temperature and maintaining this temperature for a sufficient period of time to sterilize the cheese.

5. In a process of sterilizing cheese, the steps which comprise mixing approximately 98% of cheese with 2% by weight of sodium phosphate, then heating the mass and while in a melted condition packing it in containers and thereafter sealing the containers and finally raising the temperature of the containers and its contents to approximately 240° F. and maintaining this temperature for sufficient period of time to sterilize the cheese.

6. A sterilized cheese mass consisting substantially of 98% cheese and 2% of sodium phosphate.

7. The method, herein described, of treating cheese; which consists in comminuting the cheese, adding to it a small proportion of sodium phosphate, and sterilizing the resulting mass.

8. The process herein described of treating cheese, which consists in comminuting the cheese, melting and stirring said cheese, adding to said cheese a salt of orthophosphoric acid, and sterilizing the resulting mass.

9. As an article of manufacture, cheese containing a salt of phosphoric acid and sterilized.

10. As an article of manufacture, sterilized cheese containing tertiary sodium phosphate.

11. As an article of manufacture, a sterilized cheese containing sodium phosphate and hermetically sealed in a can.

12. The method of preventing disintegration of cheese when the latter is heated to a temperature above that at which the butter fat and casein would normally separate, which consists in first comminuting the cheese, adding thereto a small percentage of sodium phosphate, heating the mass, and stirring the same during said heating, the heating being continued until there is produced a homogeneous body capable, while heated, of flowing to assume the shape of a container.

13. The improvement in the art of sterilizing cheese which consists in comminuting the cheese, heating and stirring said cheese, and incorporating with said cheese a percentage of sodium phosphate in amount sufficient to prevent disintegration, and thus to prevent separation of the butter fat and casein.

ELMER ELLSWORTH ELDREDGE.